United States Patent
Divan et al.

(10) Patent No.: US 9,190,929 B2
(45) Date of Patent: Nov. 17, 2015

(54) MULTI-LEVEL RECTIFIERS

(71) Applicant: VARENTEC, INC., San Jose, CA (US)

(72) Inventors: Deepakraj M. Divan, San Jose, CA (US); Rohit Moghe, Atlanta, GA (US); Anish Prasai, San Jose, CA (US)

(73) Assignee: VARENTEC, INC., Santa Clara, CA (US)

( * ) Notice: Subject to any disclaimer, the term of this patent is extended or adjusted under 35 U.S.C. 154(b) by 53 days.

(21) Appl. No.: 14/192,860

(22) Filed: Feb. 27, 2014

(65) Prior Publication Data

US 2014/0241019 A1 Aug. 28, 2014

Related U.S. Application Data

(60) Provisional application No. 61/769,880, filed on Feb. 27, 2013.

(51) Int. Cl.
*H02M 7/06* (2006.01)
*H02M 7/217* (2006.01)
*H02M 7/487* (2007.01)

(52) U.S. Cl.
CPC .............. *H02M 7/06* (2013.01); *H02M 7/217* (2013.01); *H02M 7/487* (2013.01)

(58) Field of Classification Search
CPC ....... H02M 7/217; H02M 1/12; H02M 7/219; H02M 1/4233; H02M 5/4585; H02M 7/483; H02M 7/797
USPC ........ 363/34–37, 77, 81–82, 84–85, 125–127
See application file for complete search history.

(56) References Cited

U.S. PATENT DOCUMENTS

| | | | | |
|---|---|---|---|---|
| 5,644,483 A * | 7/1997 | Peng et al. | | 363/37 |
| 7,751,212 B2 * | 7/2010 | Perkinson | | 363/127 |
| 7,986,538 B2 * | 7/2011 | Harke | | 363/67 |
| 2003/0128563 A1 * | 7/2003 | Rojas Romero | | 363/89 |
| 2006/0164873 A1 * | 7/2006 | Colombi et al. | | 363/41 |
| 2006/0164875 A1 * | 7/2006 | Colombi et al. | | 363/125 |

(Continued)

OTHER PUBLICATIONS

Patent Cooperation Treaty, International Search Report for PCT/US2014/019173, Jun. 20, 2014, pp. 1-3.

*Primary Examiner* — Adolf Berhane
*Assistant Examiner* — Henry Lee, III
(74) *Attorney, Agent, or Firm* — Sheppard Mullin Richter & Hampton LLP

(57) ABSTRACT

Multi-level rectifiers are provided. A multi-level rectifier may convert a medium AC voltage to a medium DC voltage. A multi-level rectifier may comprise an input inductor, a set of diodes, a set of switches, and a DC link comprising a set of capacitors. One end of the input inductor is coupled to the input AC voltage and the other end of the input inductor is coupled to a pair of diodes that are series connected. The set of switches may be regulated such that the inductor may be coupled to a DC voltage point of the DC link. A multi-level rectifier may operate under a set of operation modes. Each operation mode may be determined from the input voltage and the inductor current. Accordingly, a sinusoidal voltage at the fundamental frequency of the input voltage may be synthesized by selectively switching between adjacent operation modes of the set of operation modes. A multi-level rectifier may be used in connection with a medium voltage to low voltage DC/DC converter to form a power conversion system that converts a medium AC voltage to a low DC voltage.

16 Claims, 12 Drawing Sheets

(56) References Cited

U.S. PATENT DOCUMENTS

| | | | |
|---|---|---|---|
| 2007/0109824 A1* | 5/2007 | Romenesko | 363/41 |
| 2009/0059625 A1* | 3/2009 | Viitanen et al. | 363/36 |
| 2011/0134671 A1 | 6/2011 | Balocco | |
| 2011/0280052 A1* | 11/2011 | Al-Haddad et al. | 363/84 |
| 2011/0291737 A1* | 12/2011 | Kshirsagar | 327/426 |
| 2012/0081081 A1 | 4/2012 | Walters | |
| 2012/0257427 A1* | 10/2012 | Fattal | 363/84 |
| 2013/0076293 A1* | 3/2013 | Chen et al. | 318/729 |
| 2013/0088903 A1 | 4/2013 | Sagona et al. | |

\* cited by examiner

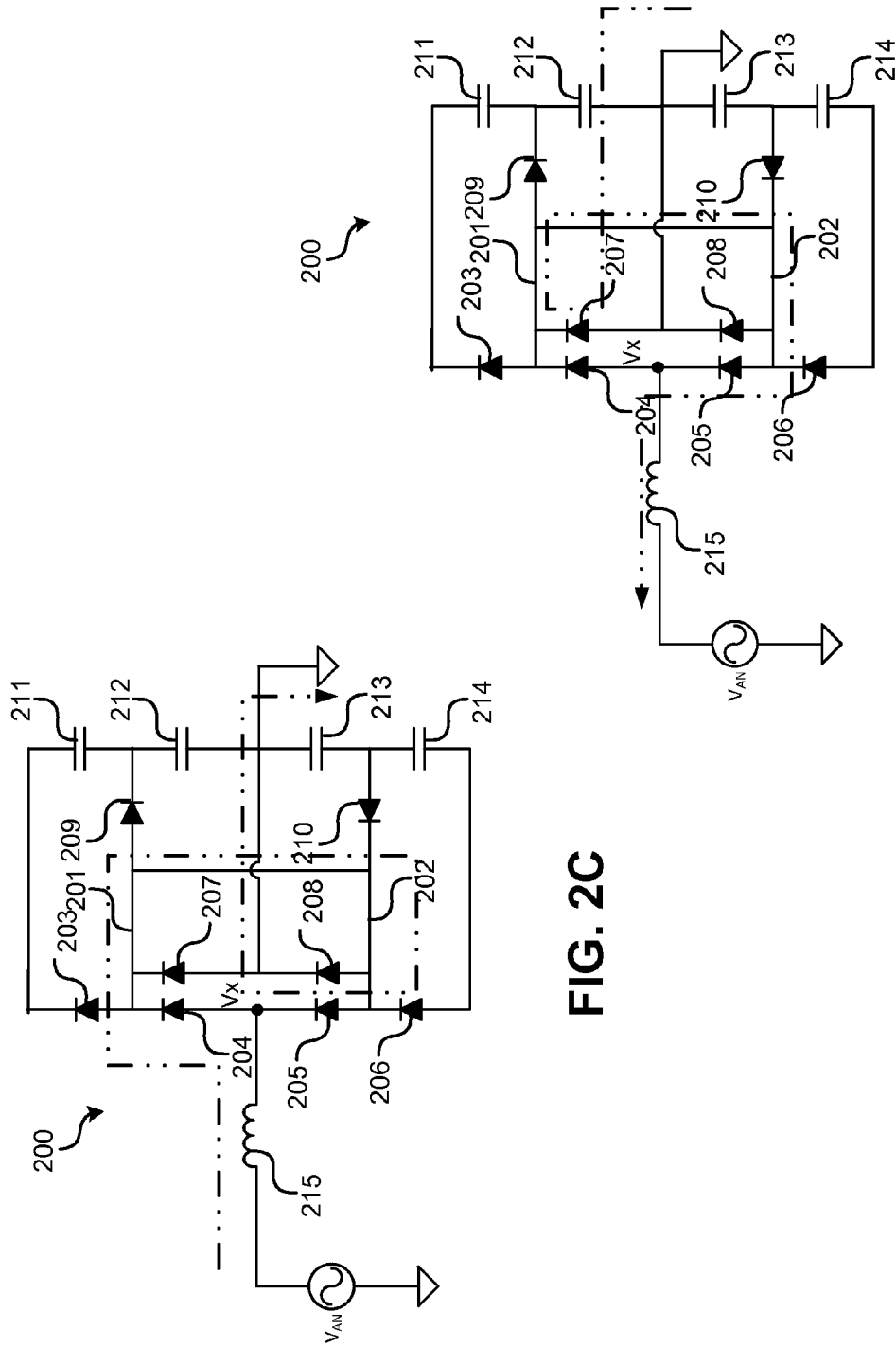

MULTI-LEVEL RECTIFIERS

CROSS-REFERENCE TO RELATED APPLICATIONS

This application claims benefit of U.S. Provisional Patent Application No. 61/769,880, filed on Feb. 27, 2013, entitled "Multi-Level Rectifier and Coordinated DC/DC Converter for Medium Voltage Applications", which is hereby incorporated herein by reference in its entirety.

TECHNICAL FIELD

The present invention(s) relate generally to multiple level rectifiers and inverters. More particularly, the invention(s) relate to systems and methods of multi-level rectifiers, implementations, and controls thereof.

DESCRIPTION OF THE RELATED ART

With the advancement in technologies, solid-state converters are used in a wide range of applications, from small switching power supplies in personal electronics, to large power systems that transmit electric power. These converters may convert alternating current (AC) power to direct current (DC) power, vice versa, or DC power to DC power.

BRIEF SUMMARY OF EMBODIMENTS OF THE INVENTION

Multi-level rectifiers are provided. Various embodiments may convert medium AC voltages (e.g., 1 to 13 kV), to medium DC voltages. Some embodiments may be used in connection with a medium voltage to low voltage DC/DC converter to form a power conversion system that converts a medium AC voltage to a low DC voltage. Various embodiments comprise an input inductor, a set of diodes, a set of switches, and a DC link comprising a set of capacitors. The set of capacitors may be coupled in series such that the DC link provides three or more DC voltage points. One end of the input inductor may be coupled to an AC voltage source and the other end of the input inductor may be coupled to a pair of diodes that are series connected. By regulating the set of switches, the inductor may be coupled to one DC voltage point of the three or more DC voltage points.

A multi-level rectifier may operate under a set of operation modes, each of which may be determined based on the input voltage and the inductor current. Various embodiments may synthesize a sinusoidal voltage at the fundamental frequency of the input voltage by selectively switching between two adjacent operation modes. For example, Pulse Width Modulation ("PWM") at a frequency that is higher than the frequency of the input voltage, or delta or hysteresis modulation may be used to synthesize the voltage. Accordingly, fractionally-rated devices may synthesize larger voltages. In addition, various embodiments reduce the Total Harmonic Distortion ("THD") in the input current and voltage without increasing the switching frequency.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 2C illustrates an operation mode of an exemplary single-phase multi-level rectifier in accordance with an embodiment of the present application.

FIG. 2D illustrates an operation mode of an exemplary single-phase multi-level rectifier in accordance with an embodiment of the present application.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Emerging applications in power conversion require conversion of three-phase medium voltage levels (e.g., 1,000 volts to 13,000 volts AC) into a controlled DC voltage (e.g., 24 volts to 350 volts.) This voltage conversion may be achieved by converting the incoming AC voltage into a DC voltage (e.g., using rectification), which is followed by a high frequency DC/DC converter. Nevertheless, such configurations require use of high voltage power semiconductor devices that may be unavailable or very expensive.

Figure 1A:
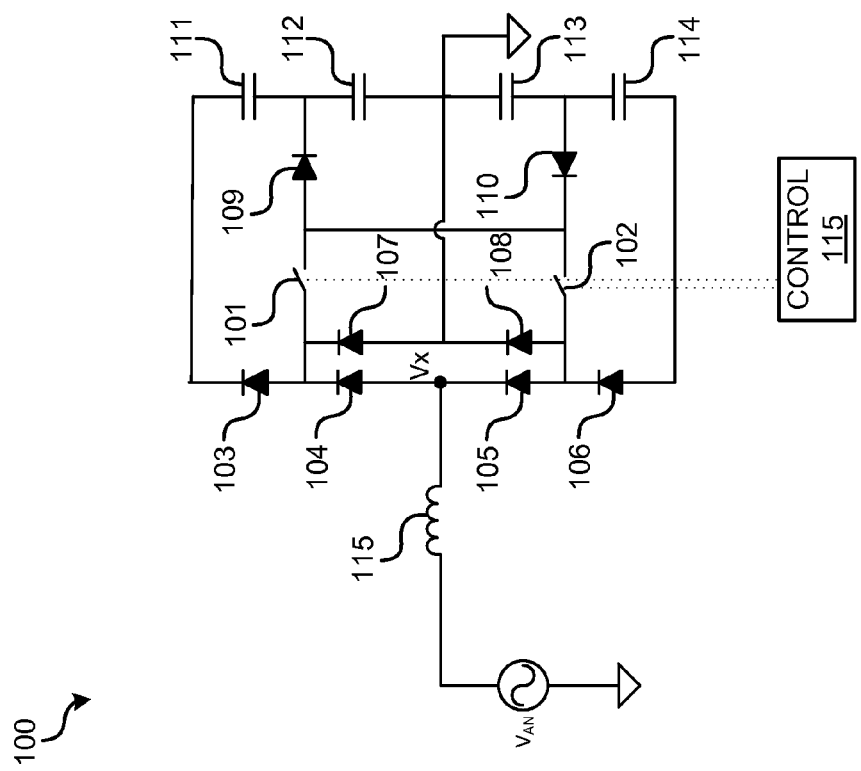
FIG. 1A illustrates an electric circuit diagram of an exemplary single-phase multi-level rectifier in accordance with an embodiment of the present application.

FIG. 1A illustrates an electric circuit diagram of an exemplary single-phase multi-level rectifier 100. The illustrated multi-level rectifier 100 comprises switches 101-102, diodes 103-110, capacitors 111-114, and an inductor 115. The inductor 115 may be coupled to an AC voltage source. The inductor 115 may be further coupled to the diodes 104 and 105, which are connected in series. The diodes 103-110 may be coupled as shown. The capacitors 111-114 are coupled in series and form a DC link. In various embodiments, the DC link provides at least three DC voltage points. The DC voltage points have an increment of Vdc, that is the voltage across a capacitor. In the illustrated example, the DC link provides five DC voltage points including +2Vdc, +Vdc, 0, −Vdc, and −2Vdc, where Vdc is the voltage across each capacitor of the DC link. As such, the illustrated multi-level rectifier 100 may have an output of a DC voltage equal to 4Vdc.

The switches 101-102 may be semiconductor switches (e.g., Insulated-gate bipolar transistors ("IGBTs") or metal-oxide-semiconductor field-effect transistors ("MOSFETs") with anti-parallel diodes. The switches 101-102 may block voltage in one direction and conduct current in both directions. In the illustrated example, each of the switches 101-102 is rated for a peak voltage of Vdc, whereas each of the diodes 103-110 may withstand a peak reverse voltage of 2Vdc. The multi-level rectifier 100 may further comprise a control module. The control module may be configured to regulate the switching of the switches 101-102 thereby regulating the output DC voltage.

Figure 1B:
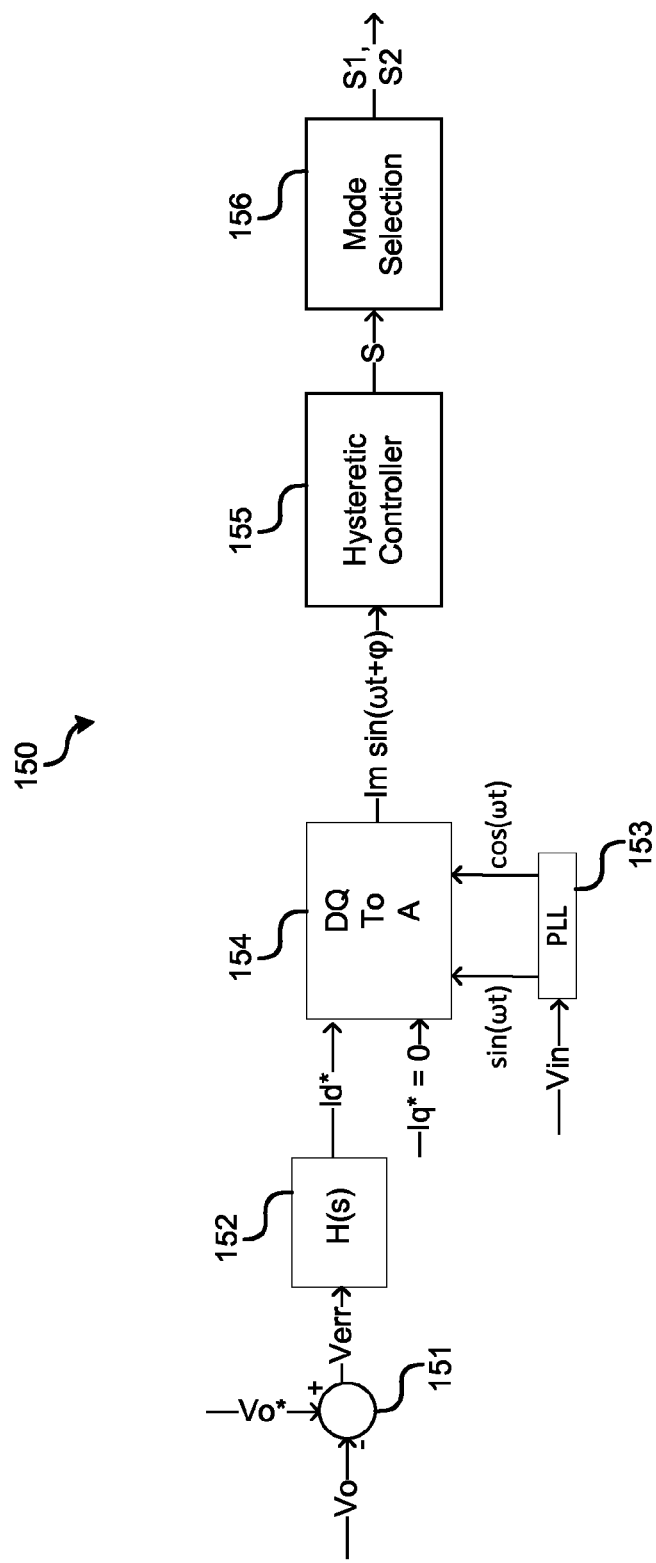
FIG. 1B illustrates an exemplary control block diagram implemented in a multi-level rectifier, such as the single-phase multi-level rectifier illustrated in FIG. 1A.

FIG. 1B illustrates an exemplary control block diagram 150 implemented in a multi-level rectifier, such as the single-phase multi-level rectifier 100 illustrated in FIG. 1A. In various embodiments, vector control is used. In the (d,q) coordinate system, at step 151, the voltage across the DC link, Vo, may be measured and compared to a reference DC link voltage, Vo*. For example, with reference to FIG. 1A, the voltage across the capacitors 111-114 is measured and compared to a reference DC voltage, Vo*. The voltage difference, Verr, between the voltage across the DC link, Vo, and the reference DC link voltage, Vo*, may be determined. Subsequently, at step 152, the magnitude of a reference input current is determined based on the voltage difference, Verr, In various embodiments, a regulator H(s) may be used to regulate the DC link voltage according to the reference DC link voltage. The output of the regulator H(s) is the magnitude of the reference input current. In various embodiments, Id* is set to be the magnitude of the input current and Iq* is set to be zero. As such, the input current is in phase with the input voltage thereby achieving a unity power factor.

At process 153, a unit vector based on the input voltage, Vin, (e.g., the grid voltage) may be generated to track the frequency and phase of the input AC voltage. A phase locked loop ("PLL") may be used to generate the unit vector, u=[sin (wt) cos(wt)]. At process 142, a sinusoidal reference input current, I*, may be determined. The sinusoidal reference input current, I*, may be in phase with the input voltage Vin. When transforming the reference current from a rotating to a stationary reference frame, the amplitude of the sinusoidal current reference, I*, is equal to Id*. At step 155, a switching signal, S, is generated based on the sinusoidal reference input current. A hysteretic controller (e.g., a hysteretic current regulator) may be used to generate the switching signal. At step 156, a mode of operation may be determined. In each mode, the inductor of a multi-level rectifier may be coupled to a corresponding DC voltage point. The mode of operation may be determined based on the switching signal, S, and the input voltage, Vin. A set of switching signals (e.g., gate drive commands) may be generated to regulate all the switches of a multi-level rectifier such that the multi-level rectifier operates in the corresponding mode. For example, a set of switching signals may be generated to regulate the switches 101 and 102 such that the multi-level rectifier 100 operates in the mode determined at step 156. Accordingly, various embodiments may regulate the input current thereby providing a power factor that is close to unity.

FIGS. 2A-2E illustrate various modes of operation of an exemplary single-phase multi-level rectifier 200. The illustrated exemplary rectifier 200 is a five-level rectifier as the voltage synthesized at the input of the rectifier, Vx, may be one of the voltage levels including 2Vdc, Vdc, 0, −Vdc, and −2Vdc. The multi-level synthesis (e.g., the five-level synthesis illustrated in FIGS. 2A-2F), may reduce the peak stress on the various components of a multi-level rectifier, reduce the voltage stress dV/dt at the point Vx, and reduce the Total Harmonic Distortion ("THD") of the filter inductor current. The switches 201 and 202 are controlled to direct the input current along a certain path through one or more diodes of the diodes 203-210 to synthesize the multiple voltage levels at the input. The difference between the input voltage, Vin, and the synthesized voltage, Vx, is imposed across the input filter inductor, VL, which induces a certain amount of current to flow. The induced current, $i_L$, may be determined according to Equation (1):

$$V_L = L \frac{di_L}{dt}. \tag{1}$$

The induced current, $i_L$, may be phase-regulated to regulate the power factor to unity and/or the output DC voltage. Under each mode of operation, a unique current path is provided by various components of the exemplary rectifier 200 in order to synthesize the voltage Vx to be at different levels of voltage.

Figures 2A, 2B:
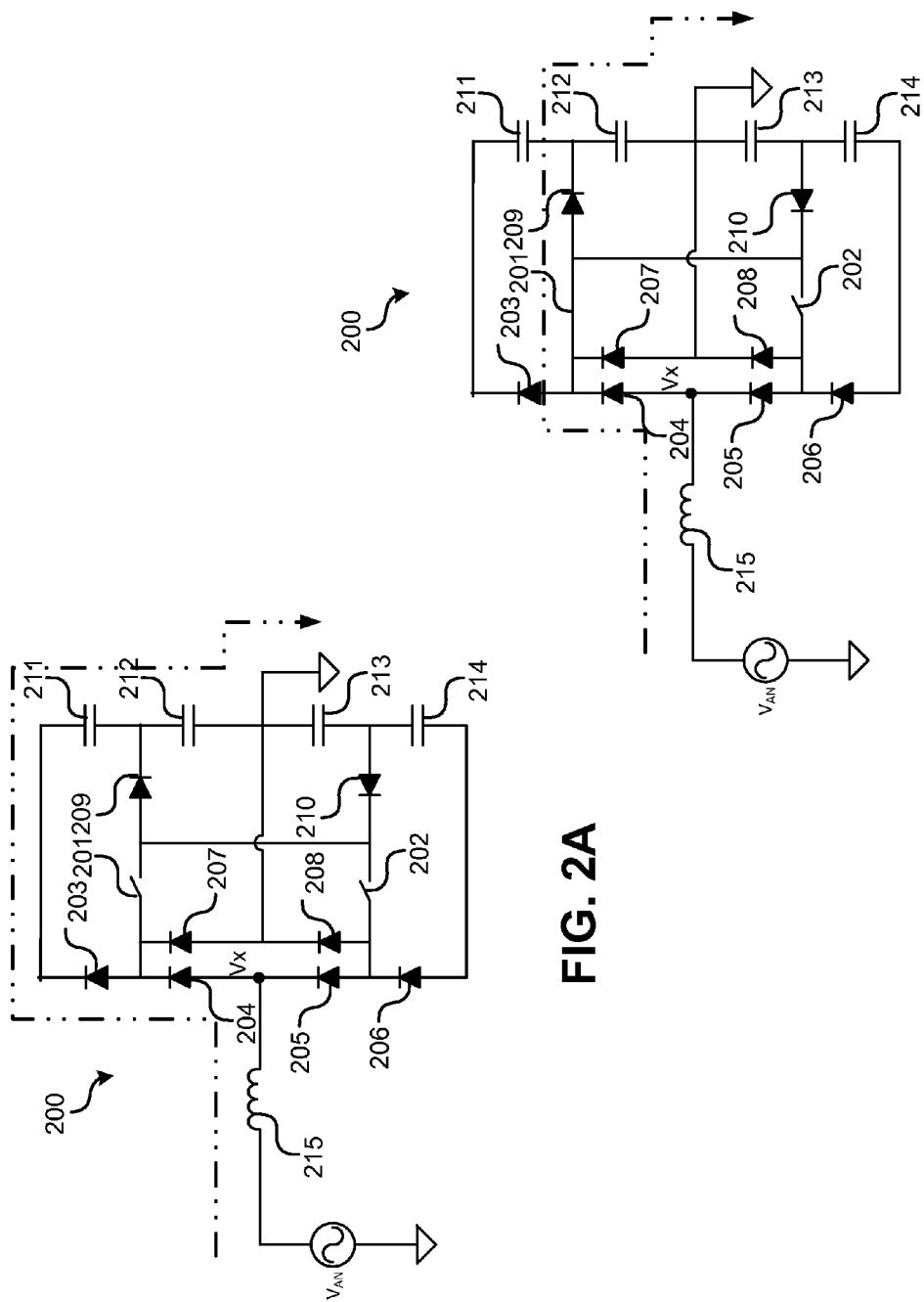
FIG. 2A illustrates an operation mode of an exemplary single-phase multi-level rectifier in accordance with an embodiment of the present application.
FIG. 2B illustrates an operation mode of an exemplary single-phase multi-level rectifier in accordance with an embodiment of the present application.

FIG. 2A illustrates a first mode of operation of the exemplary multi-level rectifier 200 when the synthesized voltage, Vx, is +2Vdc. The inductor 215 is coupled to the DC voltage point, +2Vdc. In this mode, the switches 201-202 are off, the current through the inductor 215 flows through the diodes 203-204 and into the capacitors 211-212. The current through the inductor 215 decreases while the voltage across capacitors 211-212 increases. FIG. 2B illustrates a second mode of operation of the exemplary multi-level rectifier 200 when the synthesized voltage, Vx, is +Vdc. The inductor 215 is coupled to the DC voltage point, +Vdc. In this mode, the switch 201 is on and the switch 202 is off, the current through the inductor 215 flows through the diode 207, the switch 201, the diode 209, and into the capacitor 212. The amplitude of the current through the inductor 215 is dependent on the input voltage. The current through the inductor 215 decreases when the input voltage is lower than +Vdc, and increases when the input voltage is higher than +Vdc. In this mode, only the capacitor 212 is charged.

FIG. 2C illustrates a third mode of operation of the exemplary multi-level rectifier 200 where the synthesized voltage, Vx, is 0. The inductor 215 is coupled to the DC voltage point, 0. In this mode, the switches 201-202 are on. The diode 204, the switches 201-202, and the diode 208 provide a current path. Under this operation mode, the input voltage is positive, the output voltage is 0, and the current through the inductor 215 increases. FIG. 2D illustrates a fourth mode of operation of the exemplary multi-level rectifier 200 where the synthesized voltage, Vx, is 0. The inductor 215 is coupled to the DC voltage point, 0. In this mode of operation, the switches 201-202 are on. The diode 207, the switches 201-202, and the diode 205 provide a current path. Under this operation mode, the input voltage is negative, the synthesized voltage, Vx, is 0, and the current through the inductor increases in the negative direction, the opposite direction from the mode of operation illustrated in FIG. 2C.

Figures 2E, 2F:
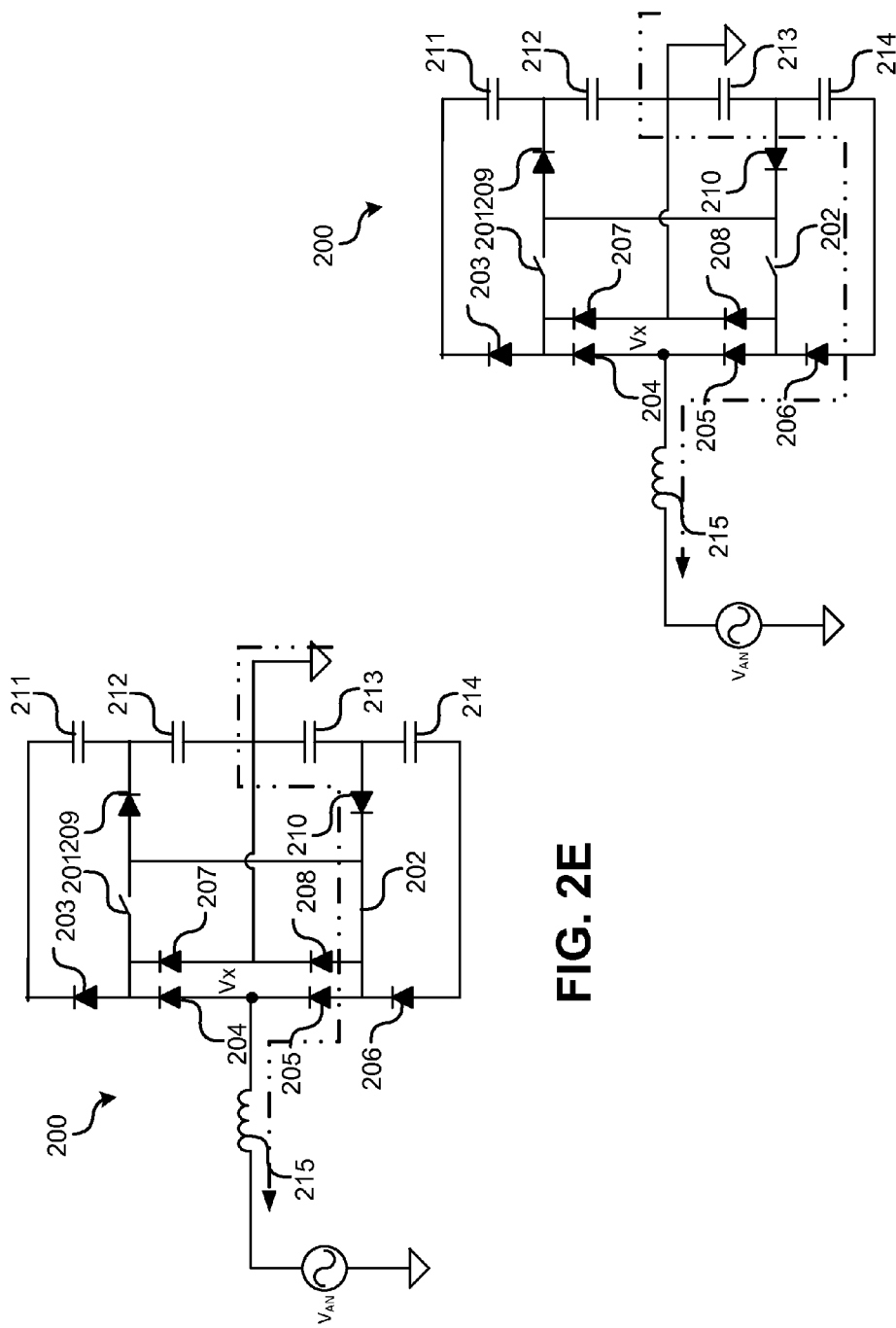
FIG. 2E illustrates an operation mode of an exemplary single-phase multi-level rectifier in accordance with an embodiment of the present application.
FIG. 2F illustrates an operation mode of an exemplary single-phase multi-level rectifier in accordance with an embodiment of the present application.

FIG. 2E illustrates the operation of the exemplary multi-level rectifier 200 where the synthesized voltage, Vx, is −Vdc. The inductor 215 is coupled to the DC voltage point, −Vdc. In this mode of operation, the switch 201 is off, and the switch 202 is on. The current path is provided by the diode 210, the switch 202, and the diode 205. Under this mode, the input voltage is negative. The current through the inductor is negative and the amplitude of the current is dependent on the input voltage. The magnitude of the current through the inductor may decrease when the input voltage is less negative than −Vdc. The magnitude of the current through the inductor may increase when the source voltage is more negative than −Vdc. FIG. 2F illustrates the operation of the exemplary multi-level rectifier 200 where the synthesized voltage, Vx, is −2Vdc. The inductor 215 is coupled to the DC voltage point, −2Vdc. In this mode, the switches 201 and 202 are off. The current path is provided by the diodes 206 and 205. Under this mode, the input voltage is negative and the current magnitude through the inductor decreases with the negative polarity. In each of the operation mode illustrated in FIGS. 2A-2F, the voltage across each of the switches 201-202 are clamped to a maximum value of Vdc as long as switching occurs between two adjacent modes (e.g., between operation modes illustrated in FIGS. 2A and 2B).

Figure 2G:
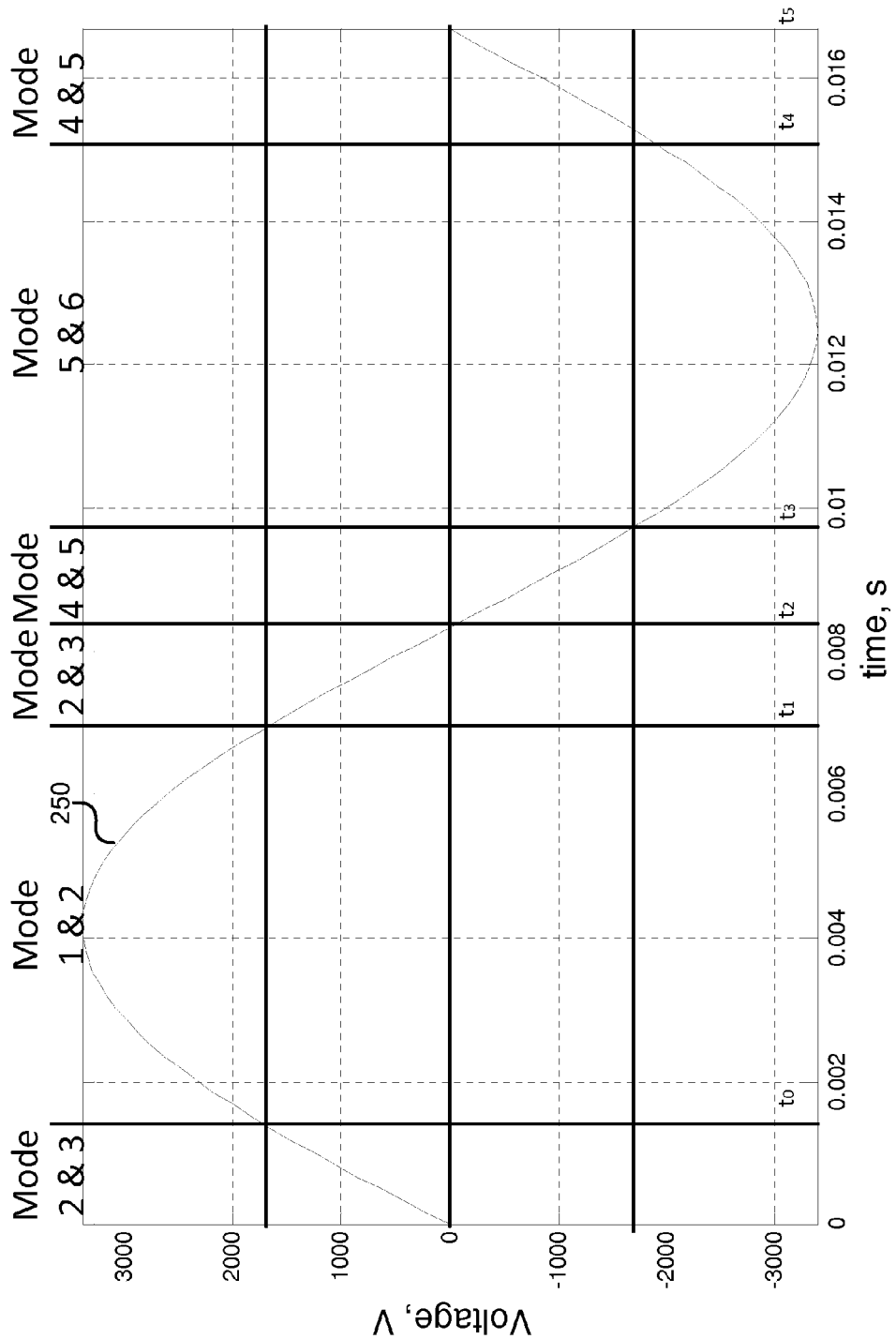
FIG. 2G illustrates an operation mode selection of an exemplary embodiment, such as the process illustrated in FIG. 1B.

Various modes of operation of a multi-level rectifier (e.g., the operation modes 1-6 illustrated in FIGS. 2A-2F, respectively), may be used to determine the synthesized voltage (e.g., Vx illustrated in FIGS. 2A-2F). In various embodiments, an AC voltage may be synthesized by modulating between two adjacent modes of operation. FIG. 2G illustrates an operation mode selection of an exemplary embodiment, such as the process 154 illustrated in FIG. 1B. Synthesis of the voltage, Vx, may occur by rapidly switching between two operation modes. In other words, synthesis of the voltage, Vx, may occur by rapidly coupling the inductor between two DC voltage points. The instantaneous input voltage, Vin, may be used to determine the operation modes for synthesizing the voltage, Vx.

In the illustrated example, curve 250 represents the input voltage, Vin. As illustrated, during the time period (0, t0), operation modes 2 and 3 illustrated in FIGS. 2B and 2C, respectively, are selected to synthesize the voltage, Vx. During the time period (t0, t1), operation modes 1 and 2 illustrated in FIGS. 2A and 2B, respectively, are selected to synthesize the voltage, Vx. During the time period (t1, t2), operation modes 2 and 3 illustrated in FIGS. 2B and 2C, respectively, are selected to synthesize the voltage, Vx. During the time period (t2, t3), operation modes 4 and 5 illustrated in FIGS. 2D and 2E, respectively, are selected to synthesize the voltage, Vx. During the time period (t3, t4), operation modes 5 and 6 illustrated in FIGS. 2E and 2F, respectively, are selected to synthesize the voltage, Vx. During the time period (t0, t1), operation modes 4 and 5 illustrated in FIGS. 2D and 2E, respectively, are selected to synthesize the voltage, Vx. In various embodiments, the two modes selected are rapidly switched with relatively high-frequency compared to the input voltage (e.g., 10-300 times of frequency of the input voltage). In various embodiments, a set of switching signals regulating the switches of a multi-level rectifier may be generated based on a synthesized voltage (e.g., a reference sinusoidal voltage) that has the same frequency as the input voltage, Vin.

Figure 3A:
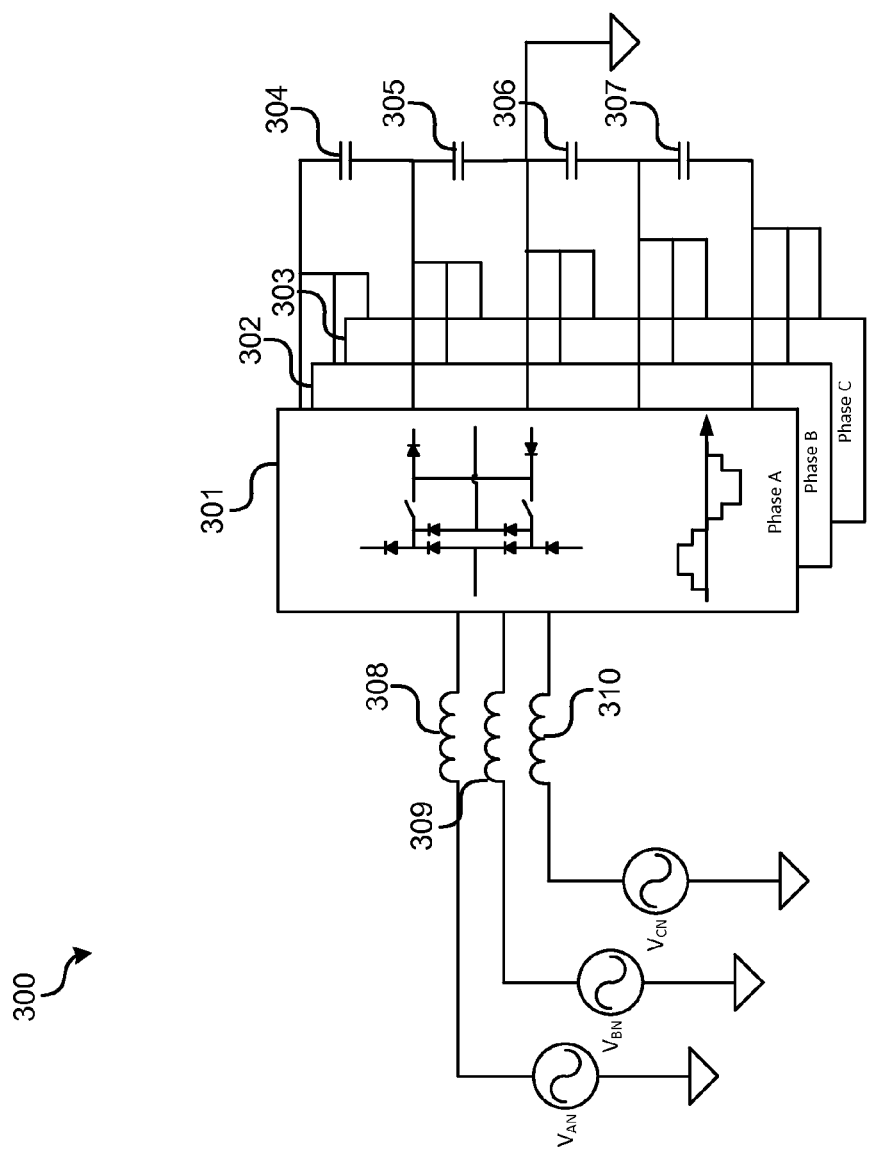
FIG. 3A illustrates an electric circuit diagram of an exemplary three-phase rectifier in accordance with an embodiment of the present application.

FIG. 3A illustrates an electric circuit diagram of an exemplary three-phase rectifier 300. As illustrated, the three-phase rectifier circuit 300 includes single-phase multi-level rectifier modules 301-303, capacitors 304-307, and inductors 308-310. Each of the single-phase multi-level rectifier modules 301-303 comprises a set of switches and a set of diodes. The set of switches and the set of diodes may be coupled according to FIG. 1. One of ordinary skill in the art would understand that the single-phase multi-level rectifier modules 301-303 may have other configurations. Each of the single-phase multi-level rectifier modules 301-303 corresponds to a phase of a three-phase power system. In the illustrated example, the single-phase multi-level rectifier modules 301-303 are coupled to phases A-C, respectively. The single-phase multi-level rectifier modules 301-303 may be connected to the capacitors 304-307. Three-phase operations may smooth out low frequency ripples, typically second harmonics associated with single-phase topologies, and thereby reduce the amount of total capacitance needed to keep the voltage ripple within a certain limit. In addition, the multi-level (e.g., five, seven, or above) operation of the rectifier 300 may reduce the amount of inductance needed to achieve a desired input current THD, and reduces the voltage step across the inductor and thus the Electromagnetic Interference ("EMI").

Figure 3B:
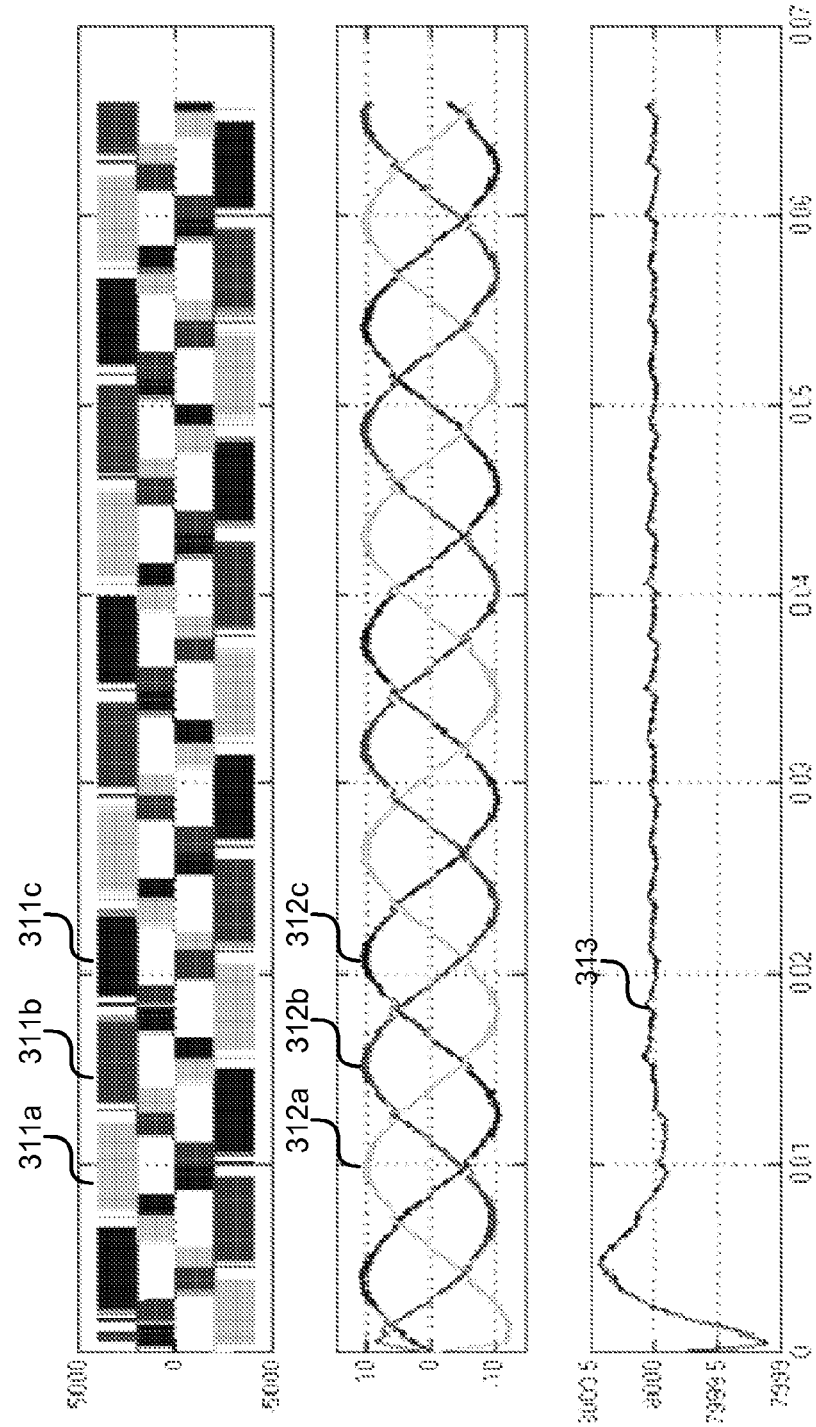
FIG. 3B illustrates operation waveforms of an exemplary embodiment, such as a three-phase five-level rectifier rated at 4.16 kV/50 kW.

FIG. 3B illustrates operation waveforms of an exemplary multi-level rectifier, such as a three-phase five-level rectifier rated at 4.16 kV/50 kW. Waveforms 311a-c illustrate the synthesized five-level voltages for phases A-C, respectively. Waveforms 312a-c illustrate the currents through the input inductor for phases A-C, respectively. Waveform 313 illustrates the DC-link voltage (e.g., the voltage across the capacitors 304-307 in FIG. 3A.) In various embodiments, the current through the inductor for each phase may be controlled such that the power factor for each phase may be regulated to be close to unity. Under all conditions, the voltage across each switch (e.g., the switches 201-202 illustrated in FIGS. 2A-2F) is always limited to Vdc. This is very beneficial especially for high voltage rectifier implementations. Coordination between switches 201 and 202 may be regulated. For instance, when the inductor current is flowing into the rectifier 200, switching between non-adjacent operation modes (e.g., operation mode 1 to operation mode 4) should be prevented because that may impose a voltage of 2Vdc across the switches 201 and 202. An improper control may subject various devices to a voltage higher than the predetermined value (e.g., the voltage limit for each device) and cause destruction of the devices.

Figure 4:
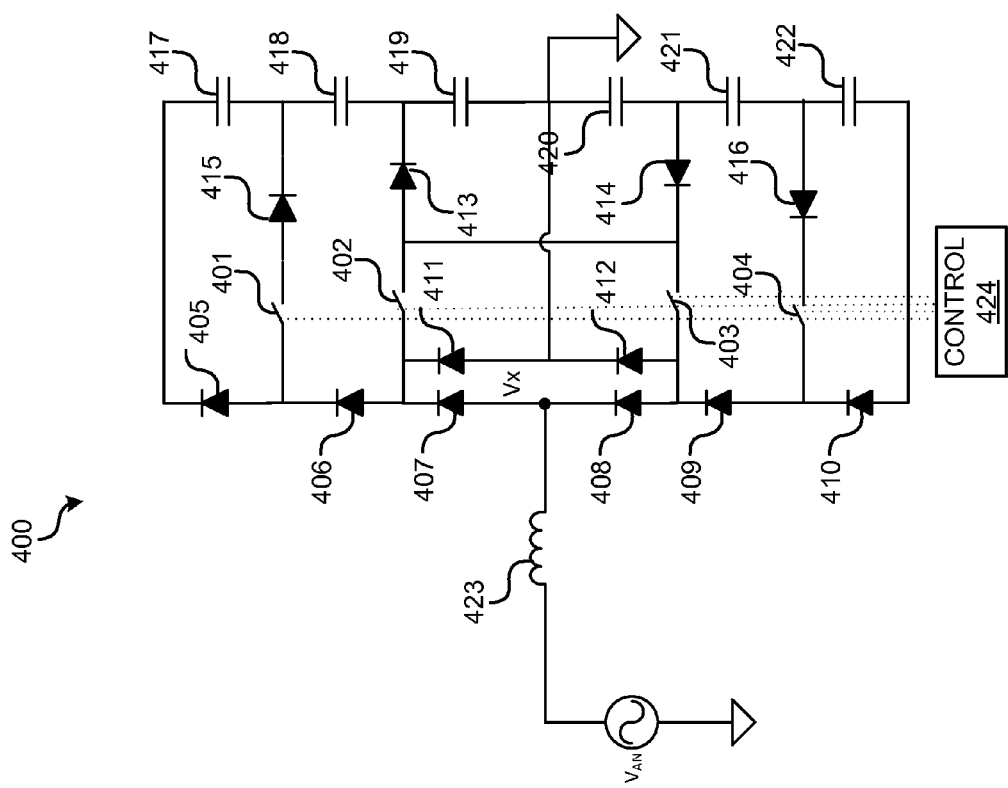
FIG. 4 illustrates an electric circuit diagram of an exemplary single-phase multi-level rectifier in accordance with an embodiment of the present application.

FIG. 4 illustrates an electric circuit diagram of an exemplary single-phase multi-level rectifier 400 in accordance with an embodiment of the present application. The illustrated single-phase multi-level rectifier 400 is a seven-level rectifier circuit as the synthesized voltage, Vx, may be one of the voltages levels including +3Vdc, +2Vdc, Vdc, 0, −Vdc, −2Vdc, and −3Vdc. The multi-level rectifier 400 may comprise switches 401-404, diodes 405-416, capacitors 417-420, and an inductor 421. The inductor 423 may be coupled to an AC voltage source providing the input AC voltage. The inductor 423 may be further coupled to the diodes 407 and 408, which are connected in series. The diodes 405-416 may be coupled as shown. The capacitors 417-422 are coupled in series and form a DC link. The DC link provides at least three DC voltage points. In the illustrated example, the DC link provides seven DC voltage points including +3Vdc, +2Vdc, +Vdc, 0, −Vdc, −2Vdc, and −3Vdc.

The single-phase multi-level rectifier 400 may further comprise a control module 424 that regulates the operations of the switches 401-404. The switches 401-404 may be semiconductor switches (e.g., IGBTs or MOSFETs) with anti-parallel diodes. Similar to the multi-level rectifier 200 illustrated in FIGS. 2A-2F, each of the switches 401-404 may be rated at Vdc and each of the diodes 405-416 at 2Vdc, where Vdc is the voltage across each of the capacitors 417-420, whereas the DC bus is rated at 6Vdc, which is the total voltage across the capacitors 417-420. One ordinary skill in the art would understand that other levels (e.g., 9-level, 11-level) of rectifiers may be extended from the configurations illustrated in FIGS. 1 and 4.

In various embodiments, operations (i.e., switching on and off) of the switches (e.g., switches 101-102 in FIG. 1 and switches 401-404 in FIG. 4) may be controlled to reduce the amount of unbalanced charging and potential collapse of the capacitor voltages such as the one across the midpoint capacitors (e.g., capacitors 112 and 113 in FIG. 1, capacitors 418-421 in FIG. 4). A control module (e.g., the control module 115 in FIG. 1, or the control module 424 in FIG. 4) may be configured to provide such regulation. In various embodiments, regardless of whether the capacitors are balanced or not, the reference for the synthesized multi-level voltage, Vx* may be determined according to Equation (2):

$$V_X^* = |V_S| \cos(\theta) \quad (2),$$

where $V_S$ is the input AC voltage (e.g., the grid voltage), $$\theta = \sin^{-1}\left(\frac{\omega L I_S}{|V_S|}\right),$$

where $I_S$ is the desired amplitude of the input current that is required to achieve a certain power throughput at unity or near-unity power factor, and L is the inductance of the input inductor. In some embodiments, it is assumed that $V_X$ and $I_S$ are in phase with each other, and the input filter inductor, L, is designed to achieve a certain ripple current. When the value of $\omega L I_S$ is less than a predetermined value, the reference multi-level voltage $V_X^*$ may be assumed to equal to the grid voltage, such that the angle $\theta$ is equal to zero.

The time spent switching between +Vdc (e.g., the operation mode 2 illustrated in FIG. 2B) and +2Vdc (e.g., the operation mode 1 illustrated in FIG. 2A) may be determined according to Equation (3):

$$T_{21} = \frac{1}{2}\frac{1}{60} - T_{10}, \quad (3)$$

where $$T_{10} = \frac{1}{60\pi}\sin^{-1}\left(\frac{0.5}{M}\right),$$

which is the time spent switching between 0 and +Vdc, and M is the effective modulation index calculated as $$M = \frac{|V_X|}{2V_{dc}}.$$

The percentage of time D spent charging both capacitors (e.g., the capacitors 211 and 212 of the multi-level rectifier 200) may be calculated according to Equation (4):

$$D = \frac{T_{21}}{T_{10} + T_{21}}(2M - 1). \quad (4)$$

The charging rate of charging capacitors 211 and 212, given as a percentage of the half-load power, may be determined according to Equations (5) and (6), respectively:

$$\Psi_{CDC1} = \frac{D}{1+D}, \quad (5)$$

$$\Psi_{CDC2} = \frac{1}{1+D}, \quad (6)$$

where the total of the charging rates are 100%: $\psi_{CDC1} + \psi_{CDC2} = 1$. One of ordinary skill in the art would understand that the time spent switching between any two adjacent modes of operations may be determined similarly.

Figure 5:
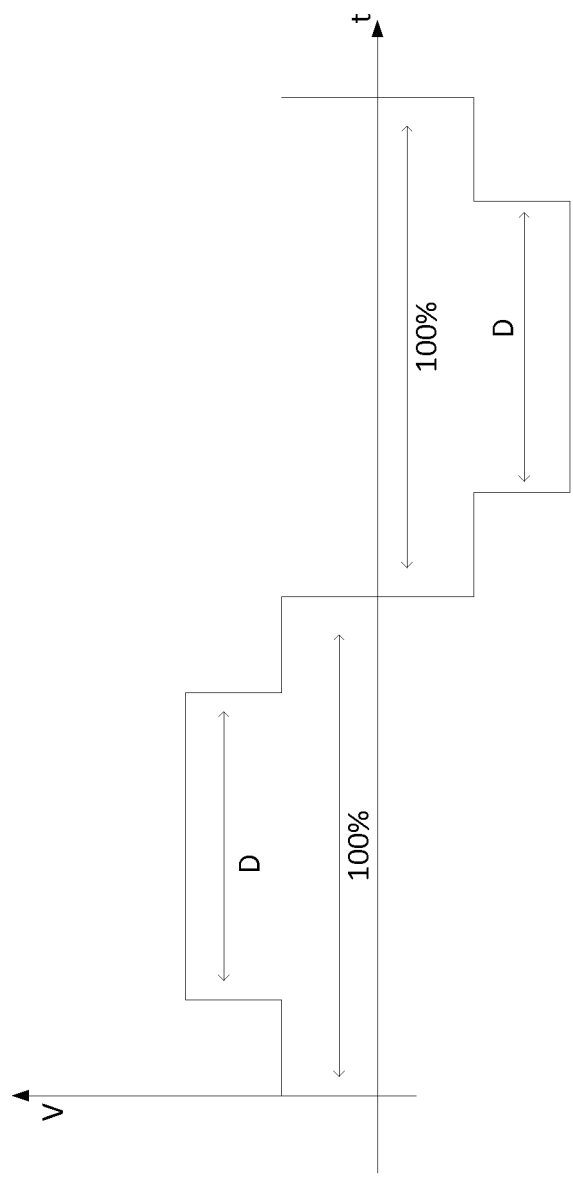
FIG. 5 illustrates the charging time profile of an exemplary embodiment, such as the single-phase five-level rectifier 100 illustrated in FIG. 1.

FIG. 5 illustrates the charging time profile of an exemplary embodiment, such as the single-phase five-level rectifier 100 illustrated in FIG. 1. As illustrated, the percentage of time spent charging the top capacitors (e.g., the capacitors 111-112 of FIG. 1) or bottom capacitors (e.g., the capacitors 113-114 in FIG. 1) during their respective half-wave is given by D, while the percentage of time spent charging the middle capacitors (e.g., the capacitors 112-113 in FIG. 1) during their respective half-wave is 100%. Various embodiments regulate the switches such that the capacitors are charged more evenly. A DC-DC converter may be used to balance the charge rates of the capacitors of a multi-level rectifier. When various embodiments are coupled to a DC-DC converter, the discharge of the capacitor occurs through the DC-DC converter. As such, the charge rates of the capacitors may be balanced by the discharge rates of the DC-DC converter.

Taking a rectifier having a 4.16 kV three-phase input, 8 kV DC output, and rated at 50 kW for example, according to Equation (3), the percentage of time charging the top capacitors or the bottom capacitors, D, is determined to be 0.42 for a modulation index of M=0.85. The rate at which one of the top capacitors (e.g., the capacitor 111) is charged is given by $\psi_{CDC1}$=0.30 or 30% of the half-load rating (25 kW), and the rate at which the other capacitor (e.g., the capacitor 112) is charged is given by $\psi_{CDC2}$=0.70 or 70% of the half-load rating. When the capacitors are not discharged with similar rates, then the voltage on the first capacitor (e.g., the capacitor 111) would start to collapse while voltage across the second capacitor (e.g., the capacitor 112) would start to increase with inverse proportionality.

In some embodiments, the modulation index M may be increased to minimize the charge rate differences among the capacitors. For example, by increasing the modulation index to M=1 may reduce the charging rate to $\psi_{CDC1}$=0.4 and $\psi_{CDC2}$=0.6. In some embodiments, the level-to-level switching strategy may be modified such that the capacitors are more equally charged at the cost of higher input current THD and larger filter inductor. In further embodiments, the rectifier may be controlled on a three-phase, three-wire basis. For example, line-to-line voltages rather than line-to-neutral voltages may be used to regulate the charging of the capacitors. As such, the three-phase rectifier may have multiple redundant states to synthesize any given voltage levels across the three input ports, which can be used to more symmetrically charge the DC-link capacitors. In some embodiments, the charging or discharging unbalance among capacitors of a DC link may be controlled through coordinated control of series stacked DC/DC converters.

Figure 6:
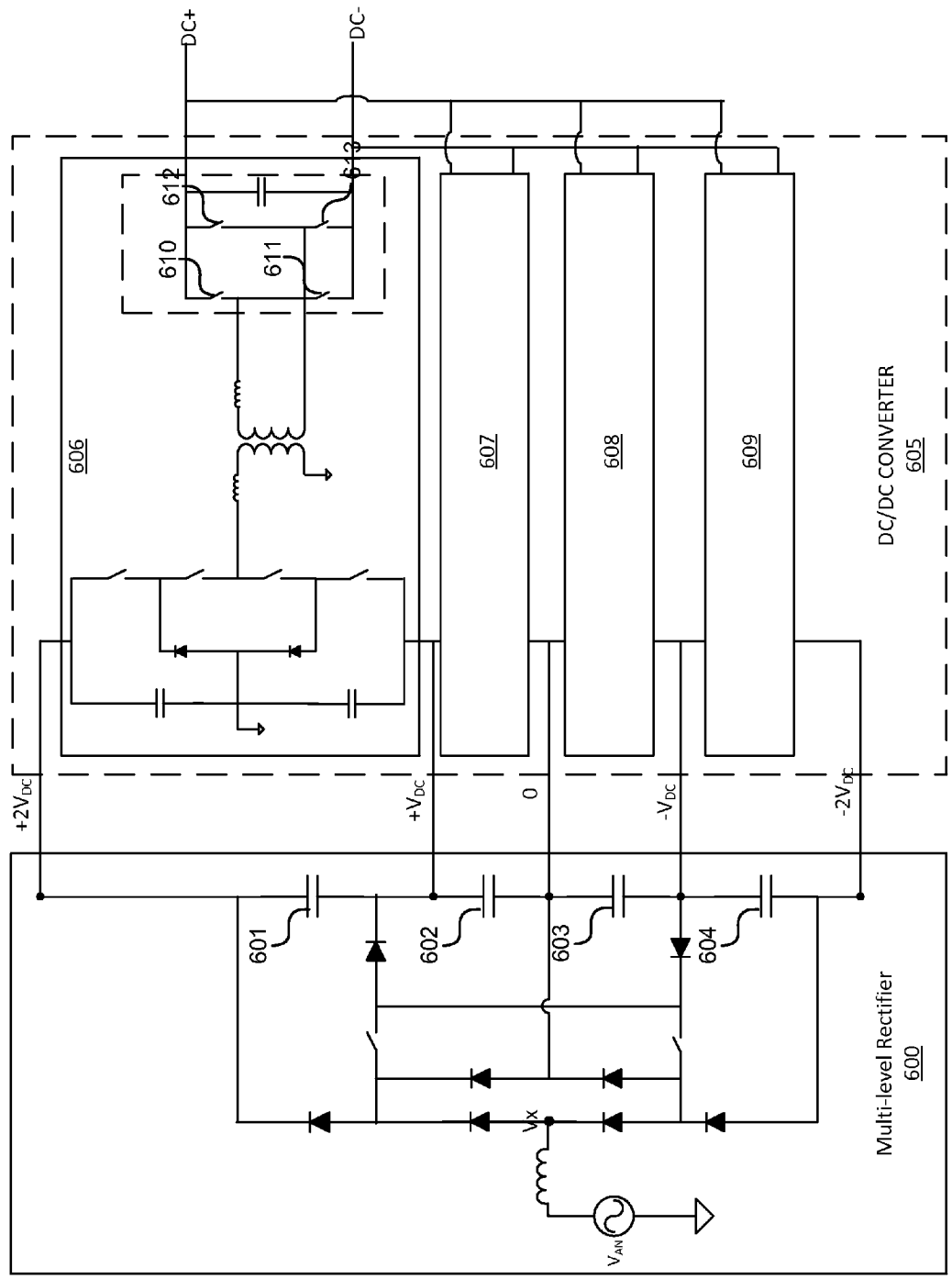
FIG. 6 illustrates an exemplary implementation of an exemplary embodiment coupled to a series stacked DC/DC converter.

FIG. 6 illustrates an exemplary implementation of a multi-level rectifier 600 coupled to a series stacked DC/DC converter 605. In the illustrated example, the DC/DC converter 605 may be used to reduce the unbalance in charging or discharging capacitors 601-604 of the multi-level rectifier 600. The series stacked DC/DC converter 605 comprises DC/DC converter cells 606-609. Each of the converter cells 606-609 is based on a Dual Active Bridge (DAB) topology illustrated of the converter cell 606. The converter cells 606-609 may be configured to have the same topology. The multi-level rectifier 600 is coupled to the series stacked DC/DC converter 605 such that each capacitor of the DC-link of the multi-level rectifier 600 is coupled to the input of a DC/DC converter cell. For example, the capacitor 601 is coupled to the input of the DC/DC converter cell 606.

The converter cells 602 and 603 may be independently controlled from the converter cells 601 and 604. Accordingly, different levels of charge that flow into various capacitors of the DC-link may be managed by discharging each capacitor at the same rate as they are charged. To cancel or reduce output DC current ripples, the converter cells 601 and 604 may operate phase staggered, and the converter cells 602 and 603 may operate phase staggered. In various embodiments, the converter cells 601-604 may have different power ratings and the difference in power ratings may be small but significant.

In various embodiments, the diodes 615 and 616 may be fast recovery diodes (e.g., diodes made of a wide band-gap material such as Silicon Carbide.) A communication channel between the multi-level rectifier 600 and the series stacked DC-DC converter 605 may be further implemented. The communication channel that facilitate communications of control of the multi-level rectifier 600 and the series-stacked DC/DC converter 605. For example, a fiber optic cable may be used to communicate the switching frequency of the multi-level rectifier 600 and the series stacked DC/DC converter 605 thereby synchronizing the signals. Various switches of the DC/DC converter 605 may be coordinated by shifting the phase relative to the fiber optic signal to achieve the overall control functionality. For example, the switches 610-613 may be coordinated by shifting the phase relative to the fiber optic signal. As the DAB converter only needs to provide unidirectional power flow control, the phase shift range should be appropriately restricted.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the invention using other computing modules or architectures.

Figure 7:
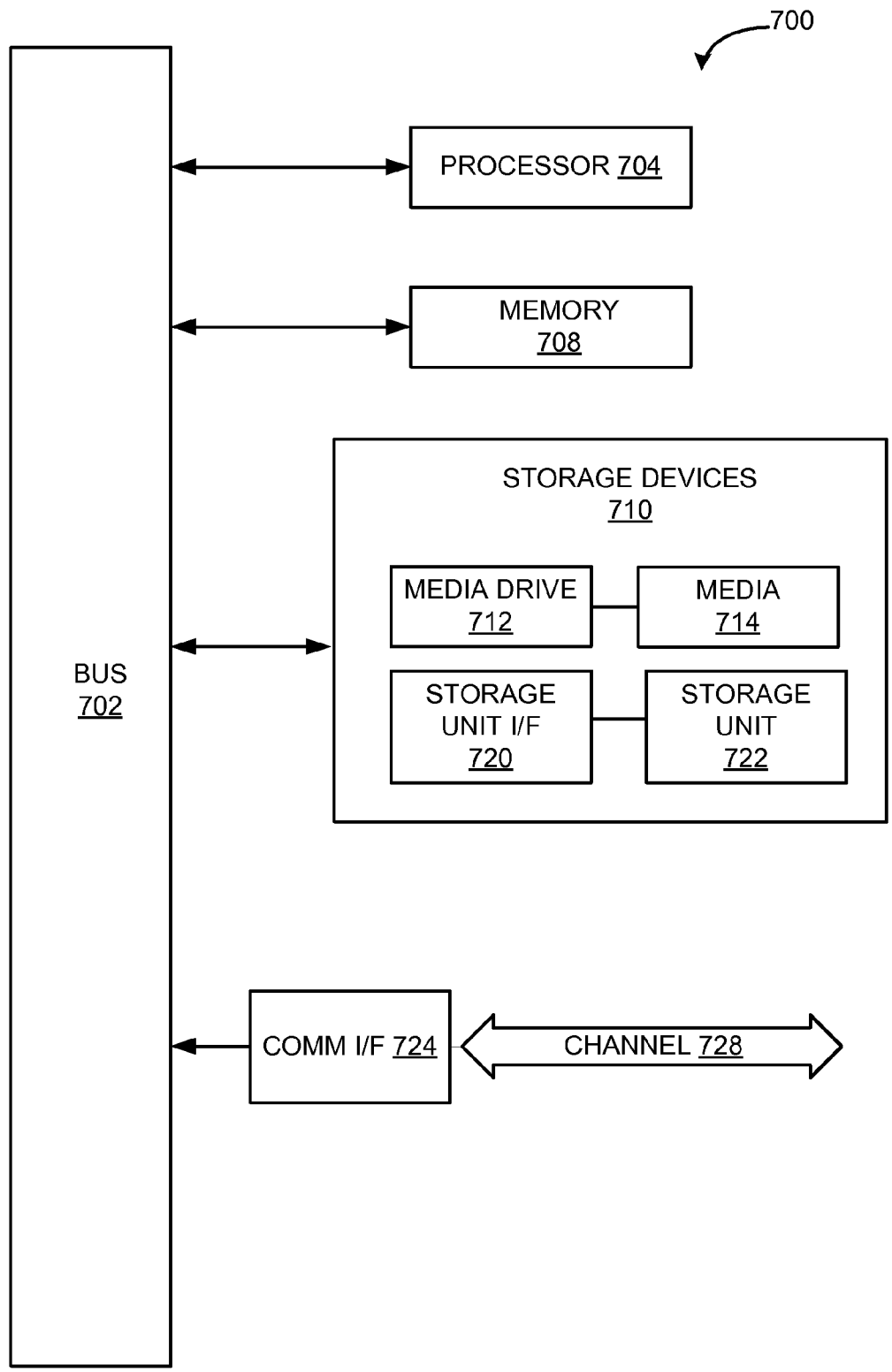
FIG. 7 illustrates an example computing module that may be used in implementing various features of embodiments of the invention.

Referring now to FIG. 7, computing module 700 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system of converting voltages, comprising:
   an inductor coupled to an AC voltage source, a first diode, and a second diode;
   a set of switches;
   a set of diodes comprising the first diode and the second diode, the first diode and the second diode coupled in series;
   a DC link comprising a set of capacitors and having three or more DC voltage points; and
   a control module configured to generate a set of switching signals to regulate the set of switches, the control module further configured to:
   determine a voltage difference between a reference output voltage and a measured output voltage;
   determine a reference current signal based on the voltage difference, the reference current signal having the same frequency as the input voltage; and
   select a first DC voltage point and a second DC voltage point of the three or more DC voltage points based on the reference current signal;
   wherein the set of switches and the set of diodes are configured to couple the inductor to a DC voltage point of the three or more DC voltage points.

2. The system of claim 1, wherein the set of switching signals are generated based on the AC voltage of the AC voltage source.

3. The system of claim 1, wherein the control module is further configured to determine a first time duration and a second time duration, the inductor coupled the first DC voltage point in the first time duration and the inductor coupled to the second DC voltage point in the second time duration.

4. The system of claim 1, wherein the first DC voltage point and the second DC voltage point are adjacent.

5. The system of claim 1, wherein each switch of the set of switches is a semiconductor switch with an anti-parallel diode.

6. The system of claim 1, wherein each switch of the set of switches is a semiconductor switch with an anti-parallel diode.

7. The system of claim 1, further comprising:
   a second inductor coupled to a second AC voltage source, a third diode, and a fourth diode;
   a second set of switches; and
   a second set of diodes comprising the third diode and the fourth diode, the third diode and the fourth diode coupled in series;
   wherein the second set of switches and the second set of diodes are configured to couple the second inductor to the DC voltage point, and the first AC voltage sources and the second AC voltage sources correspond to a first phase and a second phase of a three-phase power system.

8. The system of claim 1, further comprising a DC/DC converter comprising a set of DC/DC converter cells, the set of DC/DC converter cells being series stacked, each of the set of DC/DC converter cells is coupled to a capacitor of the set of capacitors.

9. A method of converting voltages, comprising:
   coupling a system to an AC voltage source, wherein the system comprises:
   an inductor coupled to the AC voltage source, a first diode, and a second diode;
   a set of switches,
   a set of diodes comprising the first diode and the second diode, the first diode and the second diode coupled in series,
   a DC link comprising a set of capacitors and having three or more DC voltage points, and
   a control module configured to generate a set of switching signals to regulate the set of switches, the control module further configured to:
   determine a voltage difference between a reference output voltage and a measured output voltage;
   determine a reference current signal based on the voltage difference, the reference current signal having the same frequency as the input voltage; and
   select a first DC voltage point and a second DC voltage point of the three or more DC voltage points based on the reference current signal;
   wherein the set of switches and the set of diodes are configured to couple the inductor to a DC voltage point of the three or more DC voltage points.

10. The method of claim 9, wherein the set of switching signals are generated based on the AC voltage of the AC voltage source.

11. The method of claim 9, wherein the control module is further configured to determine a first time duration and a second time duration, the inductor coupled the first DC voltage point in the first time duration and the inductor coupled to the second DC voltage point in the second time duration.

12. The method of claim 9, wherein the first DC voltage point and the second DC voltage point are adjacent.

13. The method of claim 9, wherein each switch of the set of switches is a semiconductor switch with an anti-parallel diode.

14. The method of claim 9, wherein each switch of the set of switches is a semiconductor switch with an anti-parallel diode.

15. The method of claim 9, wherein the system further comprises:
   a second inductor coupled to a second AC voltage source, a third diode, and a fourth diode;
   a second set of switches; and
   a second set of diodes comprising the third diode and the fourth diode, the third diode and the fourth diode coupled in series;
   wherein the second set of switches and the second set of diodes are configured to couple the second inductor to the DC voltage point, and the first AC voltage sources and the second AC voltage sources correspond to a first phase and a second phase of a three-phase power system.

16. The method of claim 9, further comprising coupling a DC/DC converter to the system; wherein the DC/DC converter comprises a set of DC/DC converter cells, the set of DC/DC converter cells is series stacked, and each of the set of DC/DC converter cells is coupled to a capacitor of the set of capacitors.

* * * * *